(12) United States Patent
Ludwig

(10) Patent No.: US 6,687,418 B1
(45) Date of Patent: Feb. 3, 2004

(54) CORRECTION OF IMAGE MISFOCUS VIA FRACTIONAL FOURIER TRANSFORM

(76) Inventor: Lester Frank Ludwig, 1230 Southdown Rd., Hillsborough, CA (US) 94010

( * ) Notice: Subject to any disclaimer, the term of this patent is extended or adjusted under 35 U.S.C. 154(b) by 0 days.

(21) Appl. No.: 09/512,775

(22) Filed: Feb. 25, 2000

Related U.S. Application Data

(60) Provisional application No. 60/121,680, filed on Feb. 25, 1999, and provisional application No. 60/121,958, filed on Feb. 25, 1999.

(51) Int. Cl.$^7$ ................................................ G06K 9/32
(52) U.S. Cl. ...................................... 382/280; 382/300
(58) Field of Search ................................ 382/173, 254, 382/255, 260, 274, 275, 280, 298, 312; 359/29, 31, 560; 709/232

(56) References Cited

U.S. PATENT DOCUMENTS

| | | | | |
|---|---|---|---|---|
| 5,016,976 A | * | 5/1991 | Horner et al. | 359/561 |
| 5,426,521 A | * | 6/1995 | Chen et al. | 359/9 |
| 5,432,336 A | * | 7/1995 | Carangelo et al. | 250/214 L |
| 5,544,252 A | * | 8/1996 | Iwaki et al. | 382/280 |
| 6,229,649 B1 | * | 5/2001 | Woods et al. | 359/560 |
| 6,252,908 B1 | * | 6/2001 | Tore | 375/259 |
| 6,421,163 B1 | * | 7/2002 | Culver et al. | 359/279 |
| 6,505,252 B1 | * | 1/2003 | Nagasaka | 709/232 |

OTHER PUBLICATIONS

Haldun M. Ozaktas et al., "Digital Computation of the Fractional Fourier Transform", IEEE– 1996, pp. 2141–2150.*

L. Levi, Applied Optics, vol. 2 (Section 19.2), Wiley, New York, 1980.

J. W. Goodman, Introduction to Fourier Optics, McGraw–Hill, New York, 1968.

K. Iizuka, Engineering Optics, Second Edition, Springer–Verlag, 1987.

A. Papoulis, Systems and Transforms with Applications in Optics, Krieger, Malabar, Florida, 1986.

L. F. Ludwig, "General Thin–Lens Action on Spatial Intensity (Amplitude) Distribution Behaves as Non–Integer Powers of Fourier Transform," Spatial Light Modulators and Applications Conference, South Lake Tahoe, 1988.

R. Dorsch, "Fractional Fourier Transformer of Variable Order Based on a Modular Lens System," in Applied Optics, vol. 34, No. 26, pp. 6016–6020, Sep. 1995.

E.U. Condon, "Immersion of the Fourier Transform in a Continuous Group of Functional Transforms," in Proceedings of the National Academy of Science, vol. 23, pp. 158–161, 1937.

(List continued on next page.)

Primary Examiner—Jayanti K. Patel
Assistant Examiner—Kanji Patel
(74) Attorney, Agent, or Firm—The Maxim Firm

(57) ABSTRACT

Fractional Fourier transform properties inherent in lens systems and other light and particle-beam environments may be exploited to correct misfocus effects in photographs, digital files, video, and other types of images. Small corrections may utilize fractional Fourier transform approximations around the reflection operator. The fractional Fourier transform and approximations can be rendered by optical or numerical methods, alone or in combination, directly or though use of a conventional discrete Fourier transform in combination with multiplying phase "chirps." The corrective fractional Fourier transform power may be determined automatically or by human operator. The image correction can be applied to lens-systems or other systems obeying fractional Fourier optics, including integrated optics, optical computing, particle beams, radiation accelerators, and astronomical observation, and may be incorporated into film processing machines, desktop photo editing software, photo editing websites, VCRs, camcorders, video editing systems, video surveillance systems, video conferencing systems, and other types of products and service facilities.

54 Claims, 2 Drawing Sheets

OTHER PUBLICATIONS

V. Bargmann, "On a Hilbert Space of Analytical Functions and an Associated Integral Transform," Comm. Pure Appl. Math, vol. 14, 1961, 187–214.

V. Namias, "The Fractional Order Fourier Transform and its Application to Quantum Mechanics," in J. of Institute of Mathematics and Applications, vol. 25, pp. 241–265, 1980.

B. W. Dickinson and D. Steiglitz, "Eigenvectors and Functions of the Discrete Fourier Transform," in IEEE Transactions on Acoustics, Speech, and Signal Processing, vol. ASSP–30, No. 1, Feb. 1982.

F. H. Kerr, "A Distributional Approach to Namias' Fractional Fourier Transforms," in Proceedings of the Royal Society of Edinburgh, vol. 108A, pp. 133–143, 1983.

F. H. Kerr, "On Namias' Fractional Fourier Transforms," in IMA J. of Applied Mathematics, vol. 39, No. 2, pp. 159–175, 1987.

P. J. Davis, Interpolation and Approximation, Dover, New York, 1975.

N. I. Achieser, Theory of Approximation, Dover, New York, 1992.

G. B. Folland, Harmonic Analysis in Phase Space, Princeton University Press, Princeton, NJ, 1989.

N. N. Lebedev, Special Functions and their Applications, Dover, New York, 1965.

N. Wiener, The Fourier Integral and Certain of Its Applications, (Dover Publications, Inc., New York, 1958) originally Cambridge University Press, Cambridge, England, 1933.

S. Thangavelu, Lectures on Hermite and Laguerre Expansions, Princeton University Press, Princeton, New Jersey, 1993.

M. F. Erden, "Repeated Filtering in Consecutive Fractional Fourier Domains," doctoral dissertation at Bilkent Univ., Aug. 18, 1997.

Taking the Fuzz out of Photos, Newsweek, Volume CXV, No. 2, Jan. 8, 1990.

H. M. Ozaktas, D. Mendlovic, "Fractional Fourier Transforms and their Optical Implementation I," Journal of the Optical Society of America, A vol. 10, No. 9, pp. 1875–1881, Sep. 1993.

H. M. Ozaktas, D. Mendlovic, "Fractional Fourier Transforms and their Optical Implementation II," Journal of the Optical Society of America, A vol. 10, No. 12, pp. 2522–2531, Dec. 1993.

H. M. Ozaktas, M. A. Kutay, O. Airkan, L. Onural, "Optimal filtering in Fractional Fourier Domains," IEEE Transactions on Signal Processing, vol. 45, No. 5, pp. 1129–1143, May 1997.

H. M. Ozaktas, H. Ozaktas, M. A. Kutay, O. Arikan, M. F. Erden, "Solution and Cost Analysis of General Multi–channel and Multi–stage Filtering Circuits," IEEE, Piscataway, N. J., pp 481–484, Oct. 1998.

M. A. Kutay, M. F. Erden, H.M. Ozatkas, O. Arikan, C. Candan, O. Guleryuz, "Cost–effective Approx. of Linear Systems with Repeated and Multi–channel Filtering Configurations," IEEE pp 3433–3436, May 12, 1998.

H. M. Ozaktas, H. Ozaktas, M. A. Kutay, O. Arikan, The Fractional Fourier Domain Decomposition (FFDD) to appear in Signal Processing, 1999.

M. A. Kutay, M. F. Erden, H.M. Ozatkas, O. Arikan, C. Candan, O. Guleryuz, "Space–bandwidth–efficient Realizations of Linear Systems," Optics Letters, vol. 23, No. 14, Jul. 15, 1998.

H. M. Ozatkas, D. Mendlovic, "Every Fourier Optical System is Equivalent to Consecutive Fractional–Fourier–domain Filtering," Applied Optics, vol. 35, No. 17, Jun. 1996.

H. M. Ozatkas, D. Mendlovic, "Fourier Transforms of Fractional Order and their Optical Interpretation," Optics Communications, vol. 101, No. 3, 4 pp. 163–169.

L. M. Bernardo, O. D. D. Soares, "Fractional Fourier Transforms and Imaging," Journal of Optical Society of America, vol. 11, No. 10, Oct. 1994.

Y. Bitran, H. M. Ozaktas, D. Mendlovic, R.G.Dorsch, A. W. Lohmann, "Fractional Fourier Transform: Simulations and Experimaental Results," Applied Optics vol. 34 No. 8, Mar. 1995.

M. E. Marhic, "Roots of the Identity Operator and Optics," Journal of Optical Society of America, vol. 12, No. 7, Jul. 1995.

M. A. Kutay, "Generalized Filtering Configurations with Applications in Digital and Optical Signal and Image Processing," doctoral dissertation at Bilkent Univ. Feb. 24, 1999.

* cited by examiner

CORRECTION OF IMAGE MISFOCUS VIA FRACTIONAL FOURIER TRANSFORM

STATEMENT OF RELATED CASES

This application claims the priority of U.S. provisional applications Nos. 60/121,680 and 60/121,958, filed Feb. 25, 1999, and is related to a concurrently filed U.S. application in the name of Lester F. Ludwig entitled "Image Processing Utilizing Non-Positive-Definite Transfer Functions via Fractional Fourier Transform."

BACKGROUND OF THE INVENTION

1. Field of Invention

This invention relates to optical signal processing and, more particularly, to the use of fractional Fourier transform properties of lenses to correct unfocused effects of lenses in photographs, video, or other types of captured images. The system and method herein can be applied to conventional lens-based optical image processing systems as well as to systems with other types of elements obeying Fractional Fourier optical models and as well to widely ranging environments such as integrated optics, optical computing systems, particle beam systems, radiation accelerators, and astronomical observation methods.

2. Background of the Invention

A number of references are cited herein; these are provided in a numbered list at the end of the Detailed Description. These references are cited as needed through the text by reference number(s) enclosed in square brackets. Further, the cited disclosure contained within reference [1–18] is hereby incorporated by reference.

The Fourier transforming properties of simple lenses and related optical elements is well known and heavily used in a branch of engineering known as "Fourier Optics" [1,2]. Classical Fourier Optics [1,2,3,4] uses lenses or other means to take a first two-dimensional Fourier transform of an optical wavefront, thus creating at a particular spatial location a "Fourier plane" wherein the amplitude distribution of an original two-dimensional optical image becomes the two-dimensional Fourier transform of itself. This is less well known that the far simpler area of classical geometric Optics [1,3] where lenses and related objects are used to change the magnification of a two-dimensional image according to the geometric relationship of the classical "lens-law." In an earlier paper, it was shown that between the geometries required for Classical Fourier Optics and classical geometric optics the action of a lens or related object acts on the amplitude distribution of an images as the fractional power of the two-dimensional Fourier transform The fractional power of the fractional Fourier transform is determined by the "focal length" characteristic of the lens or related object and the separation distances among the lens, the source image, and the observed image.

The Fractional Fourier transform has been independently discovered several times over the years [5,7,8,9,10] and is related to several other mathematical objects such as the Bargmann transform [8] and the Hermite semigroup [13]. As shown in [5], the most general form of optical properties of lenses and other related elements [1,2,3] can be transformed into a Fractional Fourier transform representation. This fact, to, has been apparently independently rediscovered some years later and worked on steadily ever since (see for example [6]), expanding the number of optical elements and situations covered. It is important to remark, however, that the lens modeling approach in the later long ongoing series of papers view the multiplicative-constant phase term in the true form of the Fractional Fourier transform [as a problem or annoyance and usually omit it from consideration; this is odd as, for example, it is relatively simply to take the expression for lenses from [2] and repeat the development in [5] based on the simplified expression in [1] and exactly account for this multiplicative-constant phase term.

SUMMARY OF THE INVENTION

The invention provides for corrections of the effects of misfocusing in recorded or real-time image data by means of fractional Fourier transform operations realized optically, computationally, or electronically. Herein the "term" image refers to both still-images (such as photographs, video frames, video stills, movie frames, etc.) and moving images (such as motion video and movies).

The principal aspect of the invention uses the inherent Fractional Fourier transform properties of lenses or related elements or environments, such as compound lenses or graded-index materials or environments, to correct unfocused effects of lenses in photographs, video, or other types of captured images. Exploited is the "algebraic unitary group" property of the fractional Fourier transform which allows for simple characterization of the exact inverse operation for the initial misfocus.

Another key aspect of the invention provides for relevant fractional Fourier transform operations to be accomplished directly or approximately by means of optical, numerical computer, digital signal processing, or other signal processing methods or environments.

Another aspect of the invention provides for small misfocus corrections to be made by approximating the fractional Fourier transform with its low-order derivatives with respect to its fractional power.

Another aspect of the invention provides for approximation methods which leverage Hermite function expansions which can advantageous in that the orthogonal Hermite functions diagonalize the Fourier transform and Fractional Fourier transform yielding the two-fold results:

throughout the entire optical system the amplitude and phase affairs of each Hermite function are completely independent of those of the other Hermite functions the Hermite function expansion of a desired transfer function will naturally have coefficients that eventually tend to zero, meaning that to obtain an arbitrary degree of approximation in some situations only a manageable number of Hermite functions need be handled explicitly.

A further aspect of the invention allows the power of the fractional Fourier transform to be determined by automatic methods, and these automatic methods may include edge detection elements and provisions for overriding in part or entirety by a human operator.

A further aspect of the invention provides for the fraction Fourier transform power to be determined entirely by a human operator.

Another aspect of the invention provides for the fractional Fourier transform to be computed or approximated via chirps combined with conventional Fourier transforms using appropriately scaled variables.

Yet another aspect of the invention provides for at least one pre-computed power of the fractional Fourier transform to used in computing or approximating higher powers of the fractional Fourier transform.

Yet another aspect of the invention provides for combining numerical correction of video camera lens misfocus with video decompression algorithms so as to increase performance and reduce required misfocus-correction computation.

The system and method herein can be applied to conventional lens-based optical image processing systems as well as to systems with other types of elements obeying Fractional Fourier optical models and as well to widely ranging environments such as integrated optics, optical computing systems, particle beam systems, radiation accelerators, and astronomical observation methods.

In commercial products and services areas, the invention can be incorporated into film processing machines, desktop photo editing software, photo editing web sites, VCRs, camcorders, desktop video editing systems, video surveillance systems, and video conferencing systems, as well as in other types products and service facilities.

ADVANTAGES OF THE INVENTION

The incorporation of the method of the invention allows for the recovery of sharpened images from photographs, video, movies, or other types of captured images where the image was captured out-of-focus. Because a high quality lens or lens-system operates on the amplitude distribution of the source image as a two-dimensional fractional Fourier transform, the "algebraic unitary group" property of the fractional Fourier transform allows for the exact calculation of the inverse operation for an initial lens or lens-system mis-focus. Additional mathematical properties of the fractional Fourier transform allow for several means of approximation meaningful in the economic embodiments of the invention. The system and method provided herein enable economic and wide-ranging implementation for after-capture correction of image misfocus.

The invention will be described in greater detail below with reference to the accompanying drawings.

DETAILED DESCRIPTION

Herein the "term" image refers to both still-images (such as photographs, video frames, video stills, movie frames, etc.) and moving images (such as motion video and movies).

The invention is concerned with processing presented image data, either recorded or real-time provided by an exogenous system, means, or method. This image data can be presented by means of an electronic display (such as an LCD panel, CRT, LED array, or other technologies), films, slides, illuminated photographs, or the output of some exogenous system such as an optical computer, integrated optics device, etc. The presented image data will herein be referred to as the image source. The invention is also concerned with image data then produced by the invention which is presented to a person, sensor (such as a CCD image sensor, photo-transistor array, etc.), or some exogenous system such as an optical computer, integrated optics device, etc. The latter image presentation receiving entity will herein be referred to as a observer, image observation entity, or observation entity.

Figure 2:
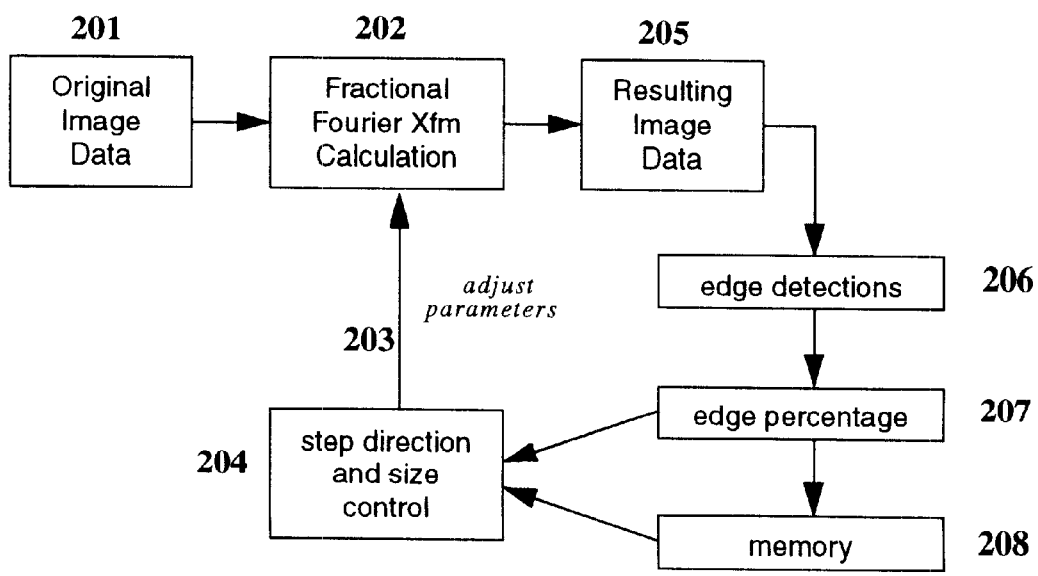
FIG. 2 shows an automated approach to adjusting the fractional Fourier transform parameters so as to maximize the sharp edge content of the resulting correcting image.
Figure 3:
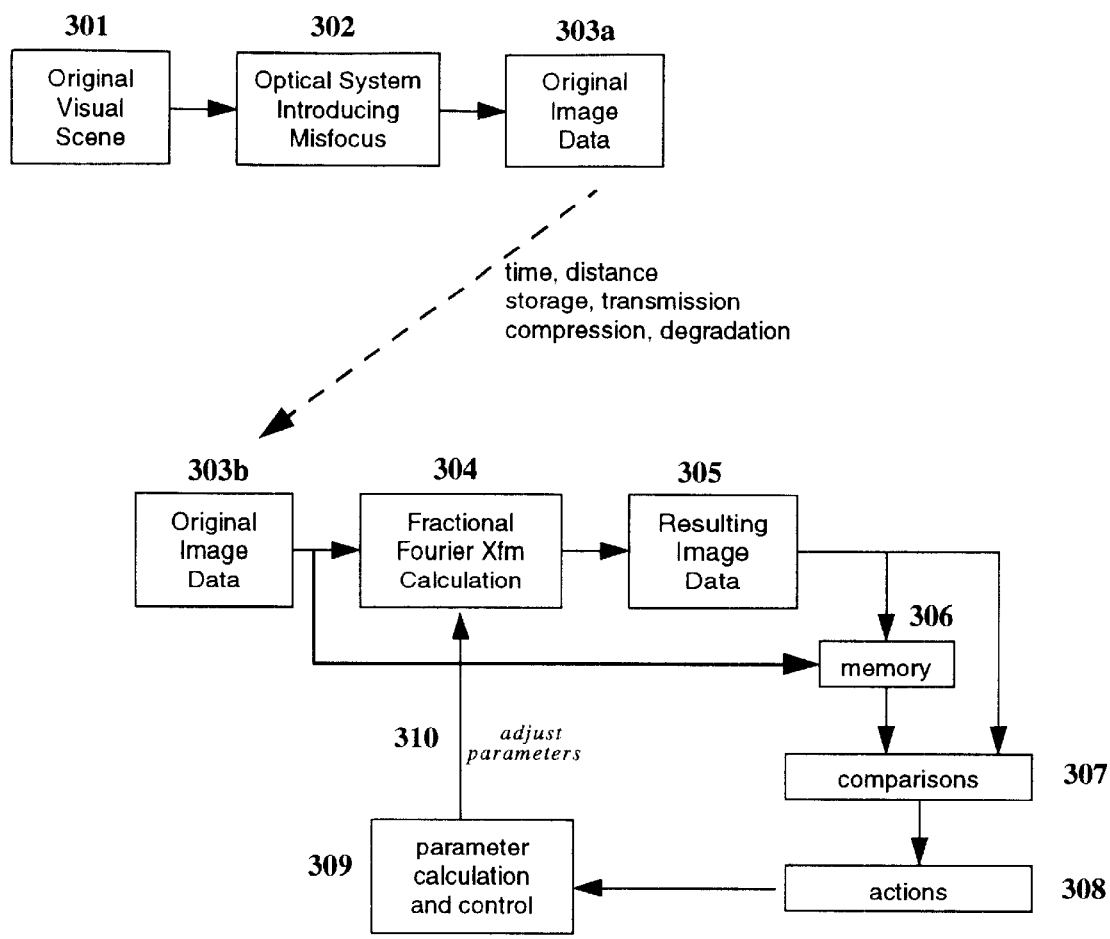
FIG. 3 shows the general context and approach of invention in adjusting the fractional Fourier transform parameters so as to maximize the correction of misfocus of the resulting correcting image.

FIG. 3 shows the general context and approach of invention in adjusting the fractional Fourier transform parameters so as to maximize the correction of misfocus of the resulting correcting image. The details of the properties and use of a fractional Fourier transform (with adjusted parameters of exponential power and scale) to correct misfocus and maximize a correction of misfocus are described later in terms of FIGS. 1 and 2.

Referring to FIG. 3, an original visual scene (or in fact any other sort of image source) 301 is observed by an optical system 302 (such as a camera and lens arrangement) to produce original image data 303a. In the context of the invention, the optical system 302 may be limited, misadjusted, defective, etc. and as a result introduces a degree of misfocus into the image represented by the image data 303a. In the context of the invention, it is not possible to correct this misfocus effect at the epochal system 302 to produce a better focused version of the original image data 303a. Rather, the misfocused original image data 303a, which may be an electronic signal, data file, photography paper, etc. in form, may be stored over time or transported over distance and in the process of which it may be transmitted, compressed/decompressed, converted, degraded, etc. resulting in an identical or perturbed version of the original image data 303b. It is this version of the original image data that the invention is concerned with improving the quality of. This version of the original image data 303b is operated on numerically, optically, or by other means so as to perform a fractional Fourier transform operation 304 on the original image data 303b so as to produce resulting (modified) image data 305. The parameters of exponential power and scale factors of the fractional Fourier transform operation 304 can be adjusted 310 over some range of values, and each parameter setting within this range will in general result in a different version of resulting image data 305. As the correction is improved, the resulting image data 305 will appear more in focus. The improvement in focus will in general be obvious to an attentive human visual observer, and typically be signified by an increase in image sharpness, particularly at any edges that appear in the image. Thus a human operator, a machine control system, or combination of each can compare a sequence of resulting images 305 created by previously selected parameter settings 310 and try a new parameter setting for a yet another potential improvement. For a human operator, this typically would be a matter of adjusting a control and comparing images side by side (i.e., facilitated by non-human memory) or, as in the case of a microscope or telescope, by comparison facilitated purely with human memory. For a machine, a systematic iterative or other feedback control scheme would be used. In FIG. 3 each of these is generalized by the steps and elements suggested by interconnected elements 306–309, although other systems or methods accomplishing the same goal with different internal structure (for example, an analog electronic circuit, optical materials, or chemical process) are provided for and anticipated by the invention. For the illustrative general case of FIG. 3, resulting image data 305 for selected parameter settings 310 are stored in human, machine, or photographic memory 306, along with the associated parameter settings, and compared 307 for the quality of image focus. Based on the comparisons, subsequent high level actions 308 are chosen. These high level actions 308 typically require translation into new parameter values and their realization, these provided by means of parameter calculation and control 309. This process may continue for some interval of time, some number of resulting images 305, or some chosen maximal level of improvement. One or more "best choice" resulting image data set(s) 305 is then identified as the result of the invention's action and process.

With this high level decsription established, attention is now directed to details of the properties and use of a fractional Fourier transform (with adjusted parameters of exponential power and scale) to correct misfocus in an image and maximize correction of misfocus.

Figure 1:
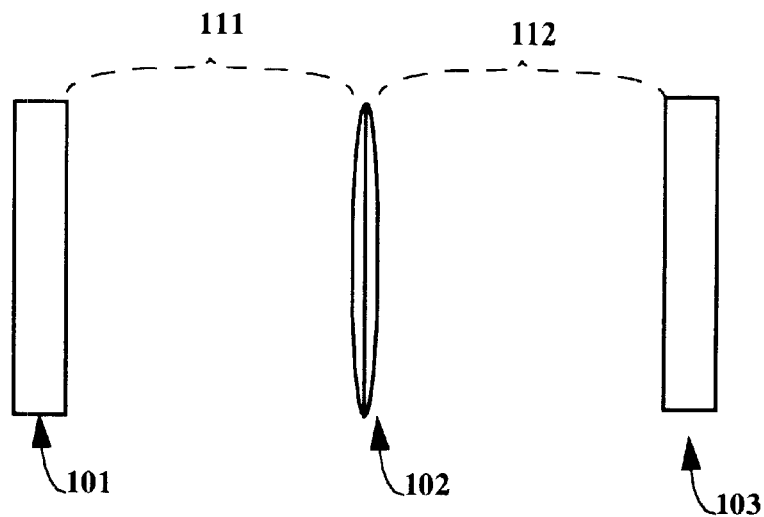
FIG. 1 shows a general arrangement involving an image source, lens or lens system or other equivalent, and an image observation entity, capable of classical geometric optics, classical Fourier optics, and fractional Fourier transform optics.

FIG. 1 shows a general arrangement involving an image source 101, lens or lens system or other equivalent 102, and an image observation entity 103, capable of classical geometric optics, classical Fourier optics, and fractional Fourier transform optics. The class of optics (geometric, Fourier, or fractional Fourier) is determined by the following:

- the separation distances 111 and 112
- the "focal length" parameter "f" of the lens or lens system or other equivalent 102.
- the type of image source (lit object, projection screen, etc.) in so far as whether a plane or spherical wave is emitted.

As is well known, the cases where the source image is a lit object and where the distances 111, which shall be called "a", and 112, which shall be called "b," fall into the "lens-law relationship" determined by the focal length f:

$$\frac{1}{f} = \frac{1}{a} + \frac{1}{b}$$

gives the geometric optics case. In this case the observed image 103 is a vertically and horizontally inverted version of the original image from the source 101 scaled in size by a magnification factor "m" given by:

$$m = \frac{b}{a}$$

The Fourier transforming properties of simple lenses and related optical elements is also well known and heavily used in a branch of engineering known as "Fourier Optics" [2,3]. Classical Fourier Optics [2,3,4,5] involves the use of a lens, lens-systems, or other means to take a first two-dimensional Fourier transform of an optical wavefront, thus creating at a particular spatial location a "Fourier plane" wherein the amplitude distribution of an original two-dimensional optical image becomes the two-dimensional Fourier transform of itself. In the arrangement of FIG. 1 with an lit object serving as the source image 101, the Fourier optics case is obtained when a=b=f.

As described in [5], for cases where a, b, and f do not satisfy the lens law of the Fourier optics condition above, the amplitude distribution of the source image 101 as observed at the observation entity 103 experiences in general the action of a non-integer power of the Fourier transform operator. As described in [5], this power, which shall be called α, varies between 0 and 2 and is determined by an Arc-Cosine function dependent on the lens focal length and the distances between the lens, image source, and image observer, specifically:

$$\alpha = \frac{2}{\pi} arcos\left[ sgn(f-a) \frac{\sqrt{(f-a)(f-b)}}{f} \right]$$

for cases where (f−a) and (f−b) share the same sign. There are other cases which can be solved for from the more primitive equations in [5] (at the bottom of pages ThE4-3 and ThF4-1). Note simple substitutions show that the lens law relationship among a, b, and f indeed give a power of 2 and that the Fourier optics condition of a=b=f give a power of 1, as required.

The fractional Fourier transform properties of lenses cause complex but predictable phase and scale variations. These can be expressed in terms of Hermite functions, as presented shortly, but it is understood that other representations of the effects, such as closed-form integral representations given in [5], are also possible and useful.

Several methods can be used to construct the fractional Fourier transform, but to begin it is illustrative to use the orthogonal Hermite functions which as eigenfunctions diagonalize the Fourier transform [17]. Consider the Hermite function [16] expansion [17, and more recently, 18] of the two dimensional image amplitude distribution function. In one dimension, a bounded (non-infinite) function k(x) can be represented as an infinite sum of Hermite functions $\{h_n(x)\}$ as:

$$k(x) = \sum_{n=0}^{\infty} a_n h_n(x)$$

Since the function is bounded the coefficients $\{a_n\}$ eventually become small and converge to zero. An image is a two dimensional entity, as is the amplitude variation of a translucent plate; in either case the function can be represented in a two-dimensional expansion:

$$k(x_1, x_2) = \sum_{m=0}^{\infty} \sum_{n=0}^{\infty} a_{n,m} h_n(x_1) h_m(x_2)$$

For simplicity, consider the one dimensional case. The Fourier transform action on Hermite expansion of the function k(x) with series coefficients $\{a_n\}$ is given by [16]:

$$F[k(x)] = \sum_{n=0}^{\infty} (-i)^n a_n h_n(x)$$

Because of the diagonal eigenfunction structure, fractional powers of the Fourier transform operator can be obtained by taking the fractional power of each of each eigenfunction coefficient. The eigenfunction coefficients here are $(-i)^n$. Complex branching artifact ambiguities that arise from taking the roots of complex numbers can be avoided through writing −i. as $$e^{-i\pi/2}$$

Thus for a given power α, the Fractional Fourier transform of the Hermite expansion of the function k(x) with series coefficients $\{a_n\}$ can be given by [5]:

$$F^\alpha[k(x)] = \sum_{n=0}^{\infty} e^{-in\pi\alpha/2} a_n h_n(x)$$

Note when α=1 the result is the traditional Fourier transform above, and when α=2 the result is $$F^2[k(x)] = \sum_{n=0}^{\infty} e^{-in\pi} a_n h_n(x) = \sum_{n=0}^{\infty} (-1)^n a_n h_n(x) = \sum_{n=0}^{\infty} a_n h_n(-x) = k(-x)$$

due to the odd and even symmetry, respectively, of the odd and even Hermite functions. This is the case for the horizontally and vertically inverted image associated with the lens law of geometric optics, although here the scale factors determining the magnification factor have been normalized out.

More generally, as the power α varies (via the Arccosine relationship depending on separation distance), the phase angle of the $n^{th}$ coefficient of the Hermite expansion varies according to the relationship shown above and the scale factor may vary as well [5]. For images all of the above occurs in the same manner but in two dimensions [5].

Through use of the Mehler kernel [16], the above expansion can be represented in closed form as [5]:

$$F^\alpha[k(x)] = \sqrt{\frac{e^{-\pi\alpha i/2}}{i\sin(\pi\alpha/2)}} \int_{-\infty}^{\infty} k(x) e^{2\pi i\left[\left(\frac{x^2+y^2}{2}\right)\cot\left(\frac{\pi\alpha}{2}\right) - xy\csc\left(\frac{\pi\alpha}{2}\right)\right]} dx$$

(Note in [5] a typographical error caused the omission of the factor of i multiplying the sin function under the radical.) Clearly both of the Hermite and integral representations are periodic in a with period 4. Further, it can be seen from either representation that $$F^{2\pm\epsilon}[k(x)] = F^2 F^{\pm\epsilon}[k(x)] = F^{\pm\epsilon} F^2[k(x)] = F^{\pm\epsilon}[k(-x)]$$

which illustrates a basis of the invention as ε will be the degree of mis-focus introduced by the mis-focused lens, lens-system, or related means while the Fourier transform raised to the second power represents the lens-law optics case. In particular, the group property makes it possible to calculate the inverse operation to the effect induced on a recorded image by mis-focused lens in terms of explicit mathematical operations that can be realized either computationally or by means of optical systems. Specifically, because the group has period 4, it follows that $F^{-2}=F^2$; then $$(F^{2\pm\epsilon}[k(x)])^{-1} = F^{-2}F^{\mp\epsilon}[k(x)] = F^2 F^{\mp\epsilon}[k(x)] = F^{\mp\epsilon} F^2[k(x)] = F^{\mp\epsilon}[k(-x)]$$

Thus, the first aspect of the invention is that for an image known to be created by a quality though mis-focused lens, lens-system, or related means, the mis-focus can be corrected by applying a fractional Fourier transform operation; specifically, if the lens, lens-system, or related means is mis-focused by an amount corresponding to the fractional Fourier transform of power ε, the mis-focus can be corrected by applying a fractional Fourier transform operation of power −ε.

It is noted that in some types of situations spatial scale factors of the image may need to be adjusted in conjunction with the fractional Fourier transform power. For small variations of the fractional Fourier transform power associated with slight misfocuses, this is unlikely to be necessary. Should spatial scaling need to be made, various optical and signal processing methods well-known to those familiar with the art can be incorporated. In the case of pixelated images (as from digital cameras) or lined-images (such as video), numerical signal processing operations way require standard resampling (interpolation and/or decimation) as is well-known to those familiar with standard signal processing techniques.

As a second aspect of the invention, it is likely that the value the of power ε is unknown. In this circumstance, the power of the correcting fractional Fourier transform operation can be varied until the resulting image is optimally sharpened. This variation could be done by human interaction, as with conventional human interaction of lens focus adjustments on a camera or microscope.

As a third aspect of the invention, the variation could also be done automatically using some sort of detector in an overall negative feedback situation. In particular, it is noted that a function with sharp edges are obtained only when its contributing smoothly-shaped basis functions have very particular phase adjustments, and perturbations of these phase relationships rapidly smooth and disperse the sharpness of the edges. Most natural images contain some non-zero content of sharp edges, and further it would be quite unlikely that a naturally occurring smooth gradient would tighten into a sharp edge under the action of the fractional Fourier transform because of the extraordinary basis phase relationships required. This suggests that a spatial high-pass filter, differentiator, or other edge detector could be used as part of the sensor makeup. In particular, an automatically adjusting system would adjust the fractional Fourier transform power so as to maximize the sharp edge content of the resulting correcting image. Such a system would also allow human override in the case of pathological image cases.

FIG. 2 shows an automated approach to adjusting the fractional Fourier transform parameters of exponential power and scale factor so as to maximize the sharp edge content of the resulting correcting image. Original image data 201 is presented to an adjustable Fractional Fourier transform element 202 which may be realized physically via optical processes or numerically (in an image processing or computation system). The power and scale factors of the Fractional Fourier transform are set and adjusted 203 as necessary under the control of a step direction and size control element 204. Typically this element would initially set the power to the ideal value of 0 (making the resulting image data 205 equivalent to the original image data 201) or 2 (making the resulting image data 205 equivalent to an inverted image the original image data 201) and then deviate slightly either direction from this initial value. The resulting image data 205 is presented to an edge detector 206 which identifies edges, via differentiation or other means, whose sharpness passes a specified fixed or adaptive threshold. The identified edge information is passed to an edge percentage tally element 207 which transforms this into a scalar-valued measure of the relative degree of the amount of edges, using this as a measure of image sharpness. The scalar measure value for each Fractional Fourier transform power is stored in memory 208 and also presented to the step direction and size control element 204. The step direction and size control element 204 compares this value with the information stored in the memory 208 and adjusts the choice of the next value of Fractional Fourier transform power accordingly. In some implementations, the step direction and size control element 204 may also control edge detection parameters, such as the sharpness threshold, of the edge detector element 207. When the optimal adjustment is determined, the image data 205 associated with the optimal Fractional Fourier Transform power is designated as the corrected image.

It is understood that the above system amounts to a negative-feedback control or adaptive control system with a fixed or adaptive observer. As such, it is understood that alternate means of realizing this automated adjustment can be applied by those skilled in the art. It is also clear to one skilled in the art that various means of interactive human intervention may be introduced into this automatic system to handle problem cases or as a full replacement for the automated system.

In general the corrective fractional Fourier transform operation can be accomplished by any one or combination of optical, numerical computer, or digital signal processing methods as known to those familiar with the art, recognizing yet other methods may also be possible. Optical methods can give effectively exact implementations of the fractional Fourier transforms or approximate ones. For a pixelated image, numerical or other signal processing methods can give exact implementations through use of the discrete version of the fractional Fourier transform [10].

Additional computation methods could also include one or more of:

- dropping the leading scalar complex-valued phase term (which almost always would have no effect on the image)
- decomposing the fractional Fourier transform as a pre-multiplication by a "phase chirp" $e^{icz^2}$, taking a conventional Fourier transform with appropriately scaled variables, and multiplying the result by another "phase chirp."
- changing coordinate systems to Wigner form $$\left\{\frac{(x+y)}{a}, \frac{(x-y)}{a}\right\}$$

Any of these can also be used with the approximating methods described below.

The remaining aspects of the invention have to do with approximation methods for realizing the corrective fractional Fourier transform operation. For a non-pixelated image, numerical or other signal processing methods can give approximations through:

- finite-order discrete approximations of the integral representation
- finite-term discrete approximations by means of the Hermite expansion representation.
- the discrete version of the fractional Fourier transform [10]

Classical approximation methods [11,12] can be used in the latter two cases, based on engineering, quality, and cost considerations.

In the case of Hermite expansions, the number of terms to include could be determined by analyzing the Hermite expansion of the image data should this be tractable. In general, there will be some value for where the Hermite function expansion of the image will loose amplitude as the order of the Hermite functions increases. Hermite function orders with zero or near-zero amplitudes may be neglected entirely from the fractional Fourier computation due to the eigenfunction role of the Hermite functions in the fractional Fourier transform operator.

One method for realizing finite-order discrete approximations of the integral representation would be to employ localized perturbation or Taylor series expansion of the integral representation. In principal, this approach typically requires some mathematical care as in order for the operator to act as a reflection operator (i.e., inversion of each of horizontal direct and vertical direction as with the lens law) the kernel behaves as a generalized function (delta function) and hence the integral representation of the fractional Fourier transform operator resembles as a singular integral. In compound lens or other composite optical systems the reflection operator will be replaced with the identity operator which also involves virtually identical delta functions and singular integrals as is known to those familiar with the art. However, this situation is fairly easy to handle as a first or second-order Taylor series expansion. The required first, second, and any higher-order derivatives of the fractional Fourier transform integral operator are readily and accurately obtained symbolically using Mathematica™, MathLab™ or other mathematical software package with symbolic differential calculus capabilities. In most cases, the zeroth order term in the expansion will be the simple reflection or identity operator. The resulting expansion may be then numerically approximated by conventional methods known to those familiar with numerical analysis.

Another method for realizing finite-order discrete approximations of the integral representation would be to employ the infinitesimal generator of the Fractional Fourier transform, i.e., the derivative of the fractional Fourier transform with respect to the power of the transform. This is readily computed from differentiating the Hermite function expansion of the fractional Fourier transform and use of the derivative rule for Hermite functions. Depending on the representation used [5,14,15], infinitesimal generator is in general a linear combination of the Hamiltonian operator H and the identity operator I; for the form of the integral representation used earlier, this would be:

$$\frac{i\pi}{4}(H+I)$$

where I simply reproduces the original function and $$H = \frac{\partial^2}{\partial x^2} - x^2$$

The role of the infinitesimal generator, which we can denote as A, is to represent an operator group as in exponential form, in this case $$F^\alpha = e^{\alpha A}$$

For small values of A, one can then approximate $e^{\alpha A}$ as I+($\alpha$A), so using the fact from before $$(F^{2+\epsilon}[k(x)])^{-1} = F^{-2}F^{\mp\epsilon}[k(x)] = F^2 F^{\mp\epsilon}[k(x)] = F^{\mp\epsilon}F^2[k(x)] = F^{\mp\epsilon}[k(-x)]$$

one can then approximate $F^\epsilon$ as $$F^\epsilon = I + (\epsilon A) = I + \epsilon \frac{i\pi}{4}\left(\frac{\partial^2}{\partial x^2} - x^2 + I\right)$$

These operations can be readily applied to images using conventional image processing methods.

For non-pixelated images, the original source image can be approximated by two-dimensional sampling and the resulting pixelated image can then be subjected to the discrete version of the fractional Fourier transform [10].

In any cases where the discrete version of the fractional Fourier transform [10] is to be used, the discrete version of the fractional Fourier transform can be approximated. The discrete representation can, for example, be a 3-dimensional matrix (tensor) operator. Alternatively pairs of standard two-dimensional matrices, one for each dimension of the image, can be used. As with the continuous case, various types of analogous series approximations, as above, to the matrix variations as powers change can be used.

Finally, it is noted that because of the commutative group property of the fractional Fourier transform, the matrix/tensor representations, or in some realizations even integrals, cited above can be approximated by pre-computing a one or more fixed step sizes and applying these, respectively, iteratively or in mixed succession to the image data.

As one example embodiment of this pre-computation method, the fractional Fourier transform representation positive and negative values of a small power, for example 0.01, can be pre-computed. Negative power deviations of increasing power can be had by iteratively applying the pre-computed −0.01 power fractional Fourier transform; for example, to realize the power −0.05 would be realized by applying the pre-computed −0.01 power fractional Fourier transform 5 times. In some cases of adaptive system realizations, it may be advantageous to not keep resulting image data from previous power calculations but rather to back up to a slightly less negative power by applying the +0.01 power fractional Fourier transform to the last store resulting image.

As a second example of this pre-computation method, pre-computed fractional Fourier transform powers taking values from the series $2^{1/N}$ and $2^{-1/N}$ can be stored or otherwise made available, for example $$\{F^{\pm 1/1024}, F^{\pm 1/512}, F^{\pm 1/256}, F^{\pm 1/128}, F^{\pm 1/64}, \ldots\}$$

Then, for example, the power 11/1024 can be realized by operating on the image data with $$F^{1/1024} F^{1/256} F^{1/128}$$

where the pre-computed operators used are determined by the binary-decomposition of the power with respect to the smallest power value (here, the smallest value is 1/1024 and the binary decomposition of 11/1024 is 1/1024+1/256+1/128, following from the fact that 11=8+2+1). Such an approach allows, for example, N steps of resolution to be obtained from a maximum of $\log_2 N$ compositions of $\log_2 N$ pre-computed values.

It is noted that the aforementioned systems and methods may be adapted for use on portions of an image rather than the entire image. This permits corrections of localized optical aberrations. In complicated optical aberration situations, more than one portion may be processed in this manner, in general with differing corrective operations made for each portion of the image.

Finally, it is noted that the systems and methods described herein can be applied to conventional lens-based optical image processing systems as well as to systems with other types of elements obeying Fractional Fourier optical models and as well to widely ranging environments such as integrated optics, optical computing systems, particle beam systems, radiation accelerators, and astronomical observation methods.

In commercial products and services areas, the invention can be incorporated into film processing machines, desktop photo editing software, photo editing web sites, VCRs, camcorders, desktop video editing systems, video surveillance systems, and video conferencing systems, as well as in other types products and service facilities.

Four example consumer-based applications are now considered.

1. The first example consumer-based application is the correction of camera misfocus in chemical or digital photography. Here the invention is used to process the image, for example optically and/or digitally, to correct the misfocus effect and create an improved image which is then used to produce a new chemical photograph or digital image data file. In this application area, the invention can be incorporated into film processing machines, desktop photo editing software, photo editing web sites, as well as in other types products and service facilities.

2. Another example consumer-based application is the correction of video camcorder misfocus. Such misfocus can happen due to incorrect operation by the user, because of design defects such as can result in the operation of a poorly designed zoom lens, or because an autofocus function is autoranging on the wrong part of the scene being video recorded. A non-varying misfocus can be corrected for each image with the same correction parameters. In the case of a zoom lens misfocus, each frame of portions of the video may require differing correction parameters. In this application area, the invention can be incorporated into VCRs, camcorders, video editing systems, video processing machines, desktop video editing software, video editing web sites, as well as in other types products and service facilities.

3. Another example commercial application is the correction of remote video camera misfocus (for example as with video conference cameras or security cameras) utilizing digital signal processing. In this scenario the video camera focus cannot be adequately or accessibly adjusted, and the video signal may in fact be compressed.

4. Video compression, as would be used in video conferencing, video mail, web-based video-on-demand, etc. may involve motion compensation operations that were performed on the unfocused video image. Here the invention may be applied employed at the video receiver or pre-processing stage prior to delivering the signal to the video receiver. If the video compression does not introduce many artifacts, the invention may be used in the form presented herein. Should the video compression introduce artifacts, the signal processing involved with the invention may greatly benefit from working closely with the video decompression signal processing. One important example of this is where misfocus corrections, after application to a full initial video frame image, are for some interval of time only performed on changing regions of the video image. Thus, for example, large portions of a misfocused background can be corrected once and reused in those same regions in subsequent video frames.

All publications and patent applications mentioned in this specification are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from its spirit or scope.

References Cited

The following references are cited herein:

[1] L. Levi, *Applied Optics,* Volume 2 (Section 19.2), Wiley, New York, 1980.

[2] J. W. Goodman, *Introduction to Fourier Optics*, McGraw-Hill, New York, 1968.

[3] K. Iizuka, *Engineering Optics*, Second Edition; Springer-Verlag, 1987.

[4] A. Papoulis, *Systems and Transformns with Applications in Optics*, Krieger, Malabar, Fla., 1986.

[5] L. F. Ludwig, "General Thin-Lens Action on Spatial Intensity (Amplitude) Distribution Behaves as Non-Integer Powers of Fourier Transform," *Spatial Light Modulators and Applications Conference*, South Lake Tahoe, 1988.

[6] R. Dorsch, "Fractional Fourier Transformer of Variable Order Based on a Modular Lens System," in *Applied Optics*, vol. 34, no. 26, pp. 6016–6020, September 1995.

[7] E. U. Condon, "Immersion of the Fourier Transform in a Continuous Group of Functional Transforms," in *Proceedings of the National Academy of Science*, vol. 23, pp. 158–161, 1937.

[8] V. Bargmann, "*On a Hilbert Space of Analytical Functions and an Associated Integral Transform,*" Comm. Pure Appi. Math, Volume 14, 1961, 187–214.

[9] V. Namias, "The Fractional Order Fourier Transform and its Application to Quantum Mechanics," in *J. of Institute of Mathematics and Applications*, vol. 25, pp. 241–265, 1980.

[10] B. W. Dickinson and D. Steiglitz, "Eigenvectors and Functions of the Discrete Fourier Transform," in *IEEE Transactions on Acoustics, Speech, and Signal Processing*, vol. ASSP-30, no. 1, February 1982.

[11] F. H. Kerr, "A Distributional Approach to Namias' Fractional Fourier Transforms," in *Proceedings of the Royal Society of Edinburgh*, vol. 108A, pp. 133–143, 1983.

[12] F. H. Kerr, "On Namias' Fractional Fourier Transforms," in *IMA J. of Applied Mathematics*, vol. 39, no. 2, pp. 159–175, 1987.

[13] P. J. Davis, *Interpolation and Approximation*, Dover, New York, 1975.

[14] N. I. Achieser, *Theory of Approximation*, Dover, New York, 1992.

[15] G. B. Folland, *Harmonic Analysis in Phase Space*, Princeton University Press, Princeton, N.J., 1989.

[16] N. N. Lebedev, *Special Functions and their Applications*, Dover, New York, 1965.

[17] N. Wiener, *The Fourier Integral and Certain of Its Applications*, (Dover Publications, Inc., New York, 1958) originally Cambridge University Press, Cambridge, England, 1933.

[18] S. Thangavelu, *Lectures on Hermite and Laguerre Expansions*, Princeton University Press, Princeton, N.J., 1993.

[19] "Taking the Fuzz out of Photos," *Newsweek*, Volume CXV, Number 2, Jan. 8, 1990.

What is claimed is:

1. A system for correcting misfocus in original image data, said system comprising:
   a fractional Fourier transform component for applying at least one fractional Fourier transform operation on said original image data, wherein at least a portion of said original image data is misfocused;
   a parameter adjuster configured with said fractional Fourier transform component, said parameter adjuster providing a range of variation of at least one parameter of the at least one fractional Fourier transform operation to correct a corresponding range of misfocus in said original image data; and
   wherein said original image data is introduced to said fractional Fourier transform component and the at least one fractional Fourier transform operation is applied to said original image data, resulting in corrected image data that corrects at least a portion of said misfocus in said original image data.

2. The system according to claim 1, wherein said original image data comprises still-image data.

3. The system according to claim 1, wherein said original image data comprises moving-image data.

4. The system according to claim 1, wherein said fractional Fourier transform component applies said at least one fractional Fourier transform operation on said original image data using optical elements.

5. The system according to claim 1, wherein said fractional Fourier transform component applies said at least one fractional Fourier transform operation on said original image data using numerical computational operations.

6. The system according to claim 1, wherein said original image data is obtained from an image source selected from the group consisting of an electronic signal, data file, photography paper, photographic slide, decompressed digital image, video frame, video stills, and motion video.

7. The system according to claim 1, wherein said original image data is provided in the form of an electronic signal.

8. The system according to claim 1, wherein said original image data is provided in the form of photographic film.

9. The system according to claim 1, wherein said original image data is provided in the form of motion video.

10. The system according to claim 1, wherein said original image data is provided in the form of a data file.

11. The system according to claim 1, wherein said corrected image data is provided to another image processing system.

12. The system according to claim 1, wherein said corrected image data comprises motion video data.

13. The system according to claim 1, wherein said parameter adjuster is at least partially operated by said system to automatically provide at least one preferred parameter value of said at least one parameter of the at least one fractional Fourier transform operation.

14. The system according to claim 1, wherein said parameter adjuster is manually operated in cooperation with said system to provide at least one preferred parameter value of said at least one parameter of the at least one fractional Fourier transform operation.

15. The system according to claim 1, wherein said parameter adjuster is manually operated to provide at least one preferred parameter value of said at least one parameter of the at least one fractional Fourier transform operation.

16. The system according to claim 1, wherein said parameter adjuster is used in an iterative process providing a plurality of parameter values of the at least one fractional Fourier transform operation, wherein said iterative process concludes with increased correction of said misfocus in said original image data.

17. The system according to claim 1, wherein at least one fractional Fourier transform operation provided by said fractional Fourier transform component is an approximation of an exact fractional Fourier transform.

18. The system according to claim 1, wherein said fractional Fourier transform component applies said at least one fractional Fourier transform operation via chirps and conventional Fourier transforms using appropriately scaled variables.

19. The system according to claim 1, wherein said fractional Fourier transform component utilizes at least one pre-computed fractional power of a fractional Fourier transform to compute other powers of the fractional Fourier transform in said fractional Fourier transform operation.

20. The system according to claim 1, wherein said misfocus in said original image data is corrected in only a subset region of said original image data.

21. The system according to claim 1, wherein said misfocus in said original image data is corrected in a plurality of subset regions of said original image data.

22. The system according to claim 1, wherein said misfocus in said original image data is corrected in a plurality of subset regions of said original image data; and
   wherein misfocus in at least two of said plurality of subset regions is corrected by different fractional powers of a fractional Fourier transform.

23. The system according to claim 1, wherein said at least one parameter of the at least one fractional Fourier transform operation comprises a fractional power of the fractional Fourier transform operation.

24. The system according to claim 1, wherein said at least one parameter of the at least one fractional Fourier transform operation comprises scale factors of the fractional Fourier transform operation.

25. The system according to claim 1, said system further comprising:
   a Web site interface for obtaining said original image data.

26. The system according to claim 1, said system further comprising:
   a Web site interface for transferring said corrected image data.

27. The system according to claim 1, said system further comprising:
   a Web site interface for controlling said fractional Fourier transform operation on said original image data.

28. A method for correcting misfocus in original image data, said method comprising:
   receiving said original image data from an image source, wherein at least a portion of said original image data is misfocused;
   utilizing a fractional Fourier transform component for applying at least one fractional Fourier transform operation on said original image data;
   introducing said original image data to said fractional Fourier transform component, wherein said fractional Fourier transform component is configured with a parameter adjuster providing a range of variation of at least one parameter of the at least one fractional Fourier transform operation to correct a corresponding range of misfocus in said original image data; and
   applying the at least one fractional Fourier transform operation to said original image data to generate corrected image data that corrects at least a portion of said misfocus in said original image data.

29. The method according to claim 28, wherein said original image data comprises still-image data.

30. The method according to claim 28, wherein said original image data comprises moving-image data.

31. The method according to claim 28, wherein said fractional Fourier transform component applies said at least one fractional Fourier transform operation on said original image data using optical elements.

32. The method according to claim 28, wherein said fractional Fourier transform component applies said at least one fractional Fourier transform operation on said original image data using numerical computational operations.

33. The method according to claim 28, wherein said image source selected from the group consisting of an electronic signal, data file, photography paper, photographic slide, decompressed digital image, video frame, video stills, and motion video.

34. The method according to claim 28, wherein said original image data is received in the form of an electronic signal.

35. The method according to claim 28, wherein said original image data is received in the form of photographic film.

36. The method according to claim 28, wherein said original image data is received in the form of motion video.

37. The method according to claim 28, wherein said original image data is received in the form of a data file.

38. The method according to claim 28, wherein said corrected image data is provided to another image processing system.

39. The method according to claim 28, wherein said corrected image data comprises motion video data.

40. The method according to claim 28, wherein said parameter adjuster is at least partially operated by an image processing system to automatically provide at least one preferred parameter value of said at least one parameter of the at least one fractional Fourier transform operation.

41. The method according to claim 28, wherein said parameter adjuster is manually operated in cooperation with an image processing system to provide at least one preferred parameter value of said at least one parameter of the at least one fractional Fourier transform operation.

42. The method according to claim 28, wherein said parameter adjuster is manually operated to provide at least one preferred parameter value of said at least one parameter of the at least one fractional Fourier transform operation.

43. The method according to claim 28, wherein said parameter adjuster is used in an iterative process providing a plurality of parameter values of the at least one fractional Fourier transform operation, wherein said iterative process concludes with increased correction of said misfocus in said original image data.

44. The method according to claim 28, wherein at least one fractional Fourier transform operation provided by said fractional Fourier transform component is an approximation of an exact fractional Fourier transform.

45. The method according to claim 28, wherein said fractional Fourier transform component applies said at least one fractional Fourier transform operation via chirps and conventional Fourier transforms using appropriately scaled variables.

46. The method according to claim 28, wherein said fractional Fourier transform component utilizes at least one pre-computed fractional power of a fractional Fourier transform to compute other powers of the fractional Fourier transform in said fractional Fourier transform operation.

47. The method according to claim 28, wherein said misfocus in said original image data is corrected in only a subset region of said original image data.

48. The method according to claim 28, wherein said misfocus in said original image data is corrected in a plurality of subset regions of said original image data.

49. The method according to claim 28, wherein said misfocus in said original image data is corrected in a plurality of subset regions of said original image data; and
   wherein misfocus in at least two of said plurality of subset regions is corrected by different fractional powers of a fractional Fourier transform.

50. The method according to claim 28, wherein said at least one parameter of the at least one fractional Fourier transform operation comprises a fractional power of the fractional Fourier transform operation.

51. The method according to claim 28, wherein said at least one parameter of the at least one fractional Fourier transform operation comprises scale factors of the fractional Fourier transform operation.

52. The method according to claim 28, said method further comprising:

obtaining said original image data via a Web site interface.

53. The method according to claim 28, said method further comprising:

transferring said corrected image data via a Web site interface.

54. The method according to claim 28, said method further comprising:

applying said at least one fractional Fourier transform operation on said original image data via a Web site interface.

* * * * *